United States Patent
Onniyil et al.

(10) Patent No.: US 10,146,606 B2
(45) Date of Patent: Dec. 4, 2018

(54) METHOD FOR SYSTEM DEBUG AND FIRMWARE UPDATE OF A HEADLESS SERVER

(71) Applicant: DELL PRODUCTS, LP, Round Rock, TX (US)

(72) Inventors: Dileesh Onniyil, Bangalore (IN); Sumanth Vidyadhara, Bangalore (IN)

(73) Assignee: Dell Products, LP, Round Rock, TX (US)

( * ) Notice: Subject to any disclaimer, the term of this patent is extended or adjusted under 35 U.S.C. 154(b) by 178 days.

(21) Appl. No.: 15/092,103

(22) Filed: Apr. 6, 2016

(65) Prior Publication Data
US 2017/0293520 A1  Oct. 12, 2017

(51) Int. Cl.
| | |
|---|---|
| G06F 11/07 | (2006.01) |
| G06F 9/44 | (2018.01) |
| G06F 8/65 | (2018.01) |
| G06F 9/4401 | (2018.01) |

(52) U.S. Cl.
CPC ............ *G06F 11/0772* (2013.01); *G06F 8/65* (2013.01); *G06F 9/4406* (2013.01); *G06F 9/4416* (2013.01); *G06F 11/079* (2013.01); *G06F 11/0745* (2013.01); *G06F 11/0751* (2013.01); *G06F 11/0793* (2013.01)

(58) Field of Classification Search
CPC ............ G06F 11/0793; G06F 11/0745; G06F 11/0751; G06F 11/0772; G06F 11/079; G06F 9/4406; G06F 8/65
See application file for complete search history.

(56) References Cited

U.S. PATENT DOCUMENTS

| | | | | |
|---|---|---|---|---|
| 7,451,324 | B2 * | 11/2008 | Schmidt | G06F 21/53 |
| | | | | 713/187 |
| 8,972,964 | B2 | 3/2015 | Beale | |
| 9,569,297 | B2 * | 2/2017 | Ali | G06F 11/0727 |
| 2004/0078543 | A1 * | 4/2004 | Koning | G06F 9/5077 |
| | | | | 711/173 |

(Continued)

OTHER PUBLICATIONS

Post-Boot PXE Client. NNRD454175. IBM technical Disclosure Bulletin. Feb. 1, 2002.*

(Continued)

*Primary Examiner* — Paul Contino
(74) *Attorney, Agent, or Firm* — Larson Newman, LLP (57) ABSTRACT

An information handling system includes a network interface device coupled to a network, a memory including first code to instantiate an operating system including an exception handler and second code to instantiate an exception handler interface and a UNDI module, and a processor to execute the first code and the second code. The network interface device is responsive to a Universal Network Device Interface (UNDI) command. The operating system detects an exception and invokes the exception handler to write a stack frame associated with the exception to the memory in response to detecting the exception. The exception handler interface determines that the stack frame has been written in the memory and directs the UNDI module to provide the UNDI command to the network interface device to communicate the stack frame to the network.

14 Claims, 4 Drawing Sheets

(56) References Cited

U.S. PATENT DOCUMENTS

| | | | |
|---|---|---|---|
| 2005/0015579 A1* | 1/2005 | Grover | G06F 11/0748 712/244 |
| 2007/0220332 A1* | 9/2007 | Marisetty | G06F 11/0772 714/30 |
| 2011/0154313 A1 | 6/2011 | Nolterieke et al. | |
| 2012/0124357 A1* | 5/2012 | Zimmer | G06F 1/3203 713/2 |
| 2012/0254667 A1* | 10/2012 | Zhang | G06F 11/0748 714/38.11 |
| 2014/0258990 A1* | 9/2014 | Klic | G06F 11/3636 717/128 |
| 2014/0372507 A1* | 12/2014 | Rutledge | H04L 67/06 709/203 |
| 2016/0019106 A1* | 1/2016 | Ali | G06F 11/0727 714/6.23 |
| 2016/0092382 A1* | 3/2016 | Anvin | G11C 7/1072 710/269 |
| 2017/0192870 A1* | 7/2017 | Kangas | G06F 11/273 |

OTHER PUBLICATIONS

"Getting Started with Nano Server," Microsoft, May 5, 2015, pp. 1-12, https://technet.microsoft.com/en-us/library/mt126167.aspx.

* cited by examiner

METHOD FOR SYSTEM DEBUG AND FIRMWARE UPDATE OF A HEADLESS SERVER

FIELD OF THE DISCLOSURE

This disclosure generally relates to information handling systems, and more particularly relates to system debug and firmware update of a headless server.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. The use of the same reference symbols in different drawings indicates similar or identical items. Embodiments incorporating teachings of the present disclosure are shown and described with respect to the drawings presented herein, in which.

SUMMARY

An information handling system can include a network interface device coupled to a network, a memory including first code to instantiate an operating system including an exception handler and second code to instantiate an exception handler interface and a Universal Network Device Interface (UNDI) module, and a processor to execute the first code and the second code. The network interface device can be responsive to a UNDI command. The operating system can detect an exception and invoke the exception handler to write a stack frame associated with the exception to the memory in response to detecting the exception. The exception handler interface can determine that the stack frame has been written in the memory and direct the UNDI module to provide the UNDI command to the network interface device to communicate the stack frame to the network.

DETAILED DESCRIPTION OF DRAWINGS

The following description in combination with the Figures is provided to assist in understanding the teachings disclosed herein, and will focus on specific implementations and embodiments of the teachings. This focus is provided to assist in describing the teachings, and should not be interpreted as limiting the scope or applicability of the teachings. Moreover, other teachings can be used along with the teachings of this disclosure, and the teachings of this disclosure can be used along with other disclosures.

Figure 1:
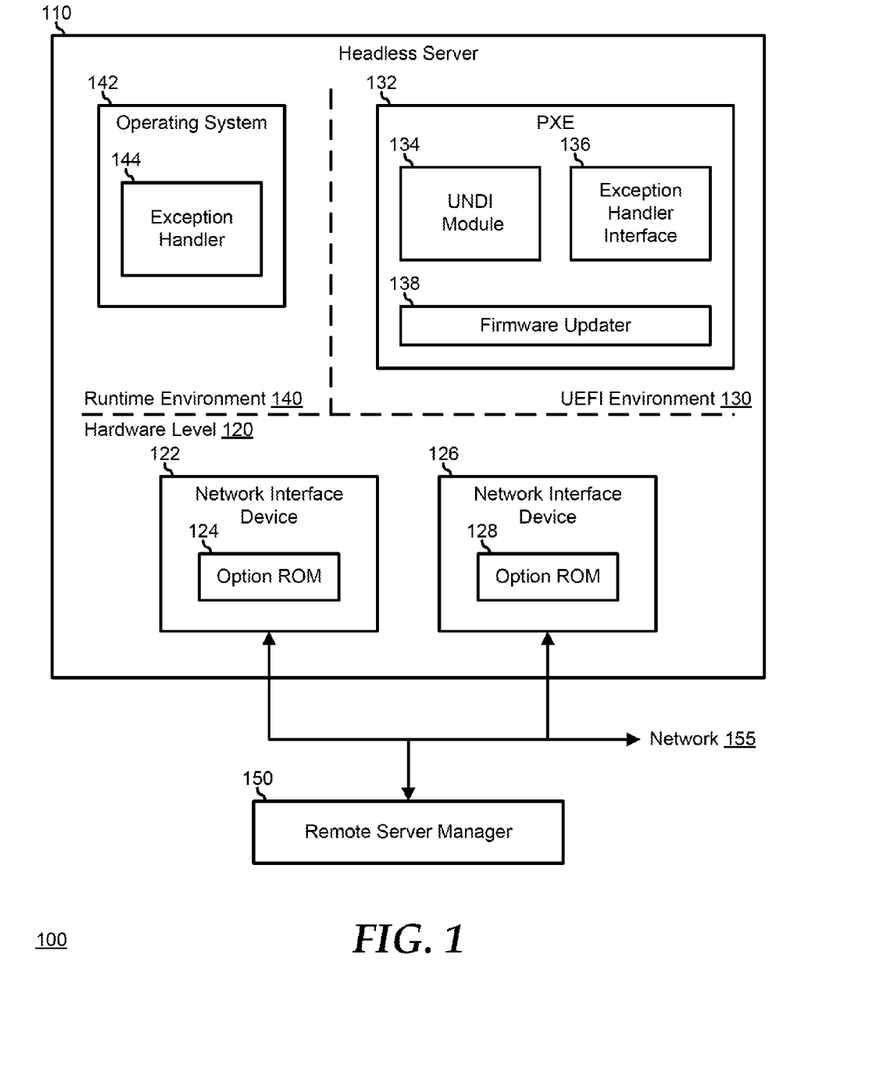
FIG. 1 is a block diagram of a headless server system according to an embodiment of the present disclosure.

FIG. 1 illustrates a headless server system 100, including a headless server 110 connected via a network 155 to a remote server manager 150. Headless server 110 represents a stripped down information handling system that is intended for use in performing processing tasks that do not need various overhead items for performing those tasks. In a particular embodiment, headless server 110 is defined in terms of diminished hardware resources. For example, headless server 110 can be configured without a graphical subsystem to provide display capabilities for the headless server. In another example, headless server 110 can be configured with minimal input/output (I/O) capabilities, such as keyboard, mouse, or other human interface device capabilities, or the like. In yet another example, headless server 110 can be configured without a service processor, or various internal communication resources, or the like.

In another embodiment, headless server 110 is implemented on a more fully featured information handling system, but the headless server runs a reduced footprint operating system that reduces or eliminates the software and firmware support for various resources, such as the graphical subsystem, various I/O functions, service processor functions or other internal communication resource functions, or the like. An example of a reduced footprint operating system includes a Nano Server option in a Microsoft Windows Server 2016 operating system, various reduced function Linux operating systems, or the like. In another embodiment, headless server 110 is implemented as a combination of a diminished hardware resource information handling system, and a reduced footprint operating system.

Headless server system 100 can be implemented where the demand for many of the more fully functioned features is minimal, but where reduced power consumption is desired. For example, where the processing needs of a data center may require little in terms of user display and I/O capability, or in terms of manageability, but where a large quantity of individual processors are still needed to perform the processing task, the overhead from enabling display devices, I/O resources, or manageability features may lead to significant wasted energy and accumulated heat in the data center, or the reduced power consumption might permit additional servers to be brought on line to meet the processing demands of the processing task.

Headless server 110 includes a hardware level 120, a Universal Extensible Firmware Interface (UEFI) environment 130, and a runtime environment 140. Hardware level 120 includes network interface devices 122 and 126. Hardware level 120 represents the circuits and devices that make up headless server 110 and can include processors, memory devices, storage devices, I/O interfaces, and the like. Network interface device 122 includes an option Read-Only Memory (ROM) 124, and network interface device 126 includes an option ROM 128. Option ROMs 124 and 128 represent non-volatile storage devices of respective network interface devices 122 and 126 that store the operating firmware associated with the network interface devices.

UEFI environment 130 represents the operating firmware of headless server 110, and includes UEFI code operable to detect the resources of headless server 110, to provide drivers for the resources, to initialize the resources, and to access the resources. UEFI environment 130 includes a Preboot Execution Environment (PXE) 132 that permits headless server 110 to access remote resources, such as storage devices or arrays, and that operates to boot up the headless server. PXE 132 includes a Universal Network Device Interface (UNDI) module 134, an exception handler interface 136, and a firmware updater 138. UNDI module 134 represents functions and features of PXE 132 that permit headless server 110 to access and control network resources, such as network interface devices 122 and 126. In particular, PXE 132 operates to locate and read option ROMs 124 and 128, and to store the contents of the option ROMs to a location in system memory, typically called a shadow RAM, that is dedicated to the storage of option ROM code. PXE 132 includes procedure calls that invoke the shadowed option ROM code to access network interface devices 122 and 126. PXE 132 can access network interfaces 122 and 126 in order to provide commands and to initialize and set-up the network interface devices. PXE 132 can also access network interfaces 122 and 126 to send and receive data and information from remote server manager 150 or other network devices coupled to the network interface devices on network 155. In a particular embodiment, UNDI module 134 represents a universal driver for one or more of network interface devices 122 and 126 that is compliant with a UNDI standard, and that provides a hardware independent and OS independent mechanism for communicating with network 155, and thus provides PXE 132 with base code to use with one or more of the network interface devices, without directly controlling the network interface devices. In a particular embodiment, UNDI module 134 is instantiated in the hardware of headless server 110. In another embodiment, UNDI module 134 is instantiated in firmware of headless server 110.

The functions and features of exception handler interface 136 and of firmware updater 138 will be described below. It will be understood that the functions and features described herein with respect to PXE 132 may be performed by other modules of a UEFI of headless server 110, as needed or desired, and that the firmware environment depicted by UEFI environment 30 may likewise represent another firmware environment, such as a Basic Input/Output System (BIOS), or the like, as needed or desired, and that the teachings of the present disclosure are not limited in their implementation to exclusively run from the PXE.

Runtime environment 140 represents the operating environment of headless server 110 for performing the processing tasks that the headless server is configured to perform. In particular, runtime environment 140 represents the operation and control of headless server 110 that is not managed by UEFI environment 130. Runtime environment 140 includes an operating system 142 that launches, operates, maintains, and closes the operating programs and applications that represent the processing tasks of headless server 110. Operating system 142 includes an exception handler 144 that directs the operation of headless server 110 in the event of a hardware or software exception.

When, in the course of booting up headless server 110, UEFI environment 130 completes the execution of PXE 132, the UEFI environment invokes an operating system boot loader to launch operating system 142. During the launch of operating system 142, the boot loader or the operating system operates to initialize a portion of system memory for use as an exception stack for exception handler 144 and to store the exception handler code, and to boot and pass execution to the OS kernel. Then, when a hardware or software exception occurs, a processor of headless server 110 invokes the exception handler code to execute an exception operation to store details about the program running on the headless server and the status of the processors onto the exception stack. The information stored on the exception stack, the stack frame, includes details about the current program running on the headless server, a counter pointing to the particular instruction that failed, snapshot information related to the status of the processor or processors, including register contents, stack pointer and instruction pointer contents, and the like. Each exception is associated with a particular argument that directs exception handler 144 as to how to proceed with handling the particular exception, such as to recover the headless server from the exception if recovery is possible, or to halt all processing on the headless server if recovery is not possible. In operation, multiple exceptions are recoverable, and so the exception stack can be stored with multiple stack frames. The stack frames can be read out from the exception stack to provide information as to the health of headless server 110, to back trace function calls and the sequence of calls, and to otherwise assist in debugging the cause of the exceptions, or where an exception is not recoverable, the cause of the crash. An example of an exception includes a segment fault, a page fault, a stack overflow, a buffer overflow, a divide-by-zero error, another fault or error identified by a processor or software operating on headless server 100.

Remote server manager 150 represents an information handling system that is connected to headless server 110 via network 155 to provide for allocating, provisioning, managing, and deallocating of the processing tasks to be performed by the headless server. For example, remote server manager 150 can instantiate a Windows Management Instrumentation (WMI) or a PowerShell environment for allocating, provisioning, managing, and deallocating of the processing tasks. In addition, remote server manager 150 operates to provide remote system monitoring and debug in the event that headless server 110 experiences an OS crash or an exception, and to track the status of firmware updates being performed on the headless server.

As noted above, headless server 110 is characterized by, in part, the fact that the functions and features of a typical server system that relate to the remote, out-of-band management of the typical server system are either not physically present on the headless server, or are otherwise not enabled in the reduced footprint operating system instantiated on the headless server. In particular, remote server manager 150 is represented as being connected to network interface devices 122 and 126, but such interconnectivity is representative of typical OS based network traffic, and not of out-of-band or management traffic, as would be the case, were headless server 110 configured to instantiate the typical out-of-band management functions on a separate network or via a separately tunneled connection between the headless server and the remote server manager. For this reason, network 155 is also shown as including additional connectivity to other network device. For example, headless server 110 can be connected to network storage resources, other server resources of a data center, an internet such as the Internet, or other network based resources, as needed or desired, and network 155 carries both management traffic between headless server 110 and remote server manager 150, and OS based traffic between the headless server and the other devices and systems on the network.

Remote server manager 150 provides remote system monitoring and debug in the event that headless server 110 experiences an OS crash or an exception. Here, when headless server 110 experiences an OS crash or another hardware or software exception, headless server 110 invokes exception handler 144 to execute an exception operation to store a stack frame on the exception stack. Further, exception handler 144 is configured to invoke exception handler interface 136 in PXE 132 to provide the stack frame via one of network interface devices 122 and 126 to remote server manager 150, using the function calls, procedures, and drivers implemented by UNDI module 134. Here, exception handler interface 136 makes calls to UNDI module 134 which, using the code and drivers from one of option ROM 124 and 128 shadowed in memory, directs the one of network interface devices 122 and 126 to communicate the stack frame to remote server manager 150. For example, exception handler interface 136 can initiate a particular opcode, such as PXE_OP_EXCEPTION, that encapsulates the stack frame into a UNDI Command Descriptor Block (CDB) and calls UNDI module 134 to communicate the stack frame to remote server manager 150. In this way, although the operating system running on headless server 110 may be unable to communicate information on network 155 via typical UEFI based service calls, on account of the OS crash or other exception, headless server 110 can nevertheless communicate exception information via PXE 132.

In a particular embodiment, exception handler 144 is configured to call exception handler interface 136 in the event of an OS crash or other exception, and the exception handler interface communicates the exception frame to remote server manager 150 in response to the call from the exception handler. In another embodiment, exception handler interface 136 is configured to monitor runtime environment 140 to detect when an exception opcode is executed, and to communicate the exception frame to the remote server manager in response to detecting the exception opcode. In yet another embodiment, remote server manager 150 periodically directs communications to exception handler interface 136 via one of network interface devices 122 and 126, to poll the exception handler interface to determine whether or not headless server 110 is operating normally, and if not, to determine the nature and extent of any exceptions on headless server 150.

Remote server manager 150 also operates to track the status of firmware updates being performed on headless server 110. Here, when headless server 110 undergoes a firmware update, firmware updater 138 can execute a Firmware Management Protocol (FMP) procedure to flash a new firmware payload to a non-volatile memory of headless server 110. For example, firmware updater 138 can execute a FMP SetImage command with a particular firmware payload as the command operand. The FMP SetImage command operates to return a firmware update progress bar that provides a firmware update process completion value, such as a percentage. Firmware updater 138 includes code to execute a FMP ProgressBar CallBack command that provides the completion percentage. Firmware updater 138 further includes code to make calls to UNDI module 134 which, using the code and drivers from one of option ROM 124 and 128 shadowed in memory, directs the one of network interface devices 122 and 126 to communicate the firmware update process completion value to remote server manager 150.

Figure 2:
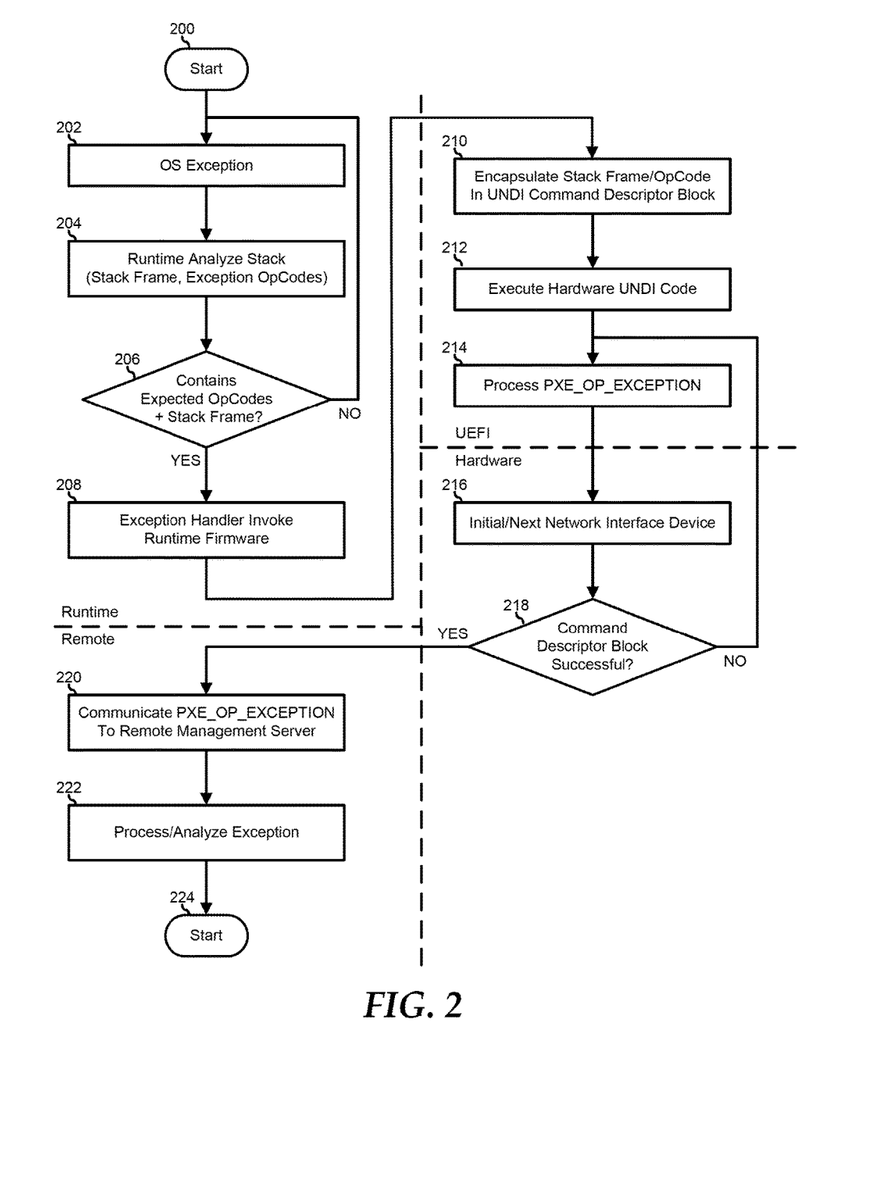
FIG. 2 is a flowchart illustrating a method for providing remote system monitoring and debug in a headless server according to an embodiment of the present disclosure.

FIG. 2 is a flowchart illustrating a method for providing remote system monitoring and debug in a headless server starting at block 200. The method begins operation in a runtime environment of the headless server, where an OS of a headless server experiences an OS crash or another exception and a processor of the headless server invokes the exception handler in block 202. Here, the exception handler code can execute an exception operation to store a stack frame onto the exception stack. A runtime service analyzes the exception stack, such as by evaluating the stack frames and exception opcodes associated with the exception in block 204, to determine if the exception should be communicated to a remote management server. For example, the runtime service can include a list of stack frame conditions and exception opcodes that indicate that the exception should be communicated to the remote management server. An example of the runtime service includes an exception handler of the OS instantiated on the headless server or an exception handler interface instantiated on a PXE of the UEFI environment of the headless server. A decision is made as to whether or not the exception should be communicated to the remote management server in decision block 206. For example, the runtime service and determine if the stack frame conditions or exception opcodes are included in the list of tack frame conditions and exception opcodes that indicate that the exception should be communicated to the remote management server. If the exception is not to be communicated to the remote management server, the "NO" branch of decision block 206 is taken and the method returns to block 202 where the OS waits to experience an OS crash or another exception.

If the exception is to be communicated to the remote management server, the "YES" branch of decision block 206 is taken, the exception handler invokes the runtime firmware included in an exception handler interface of the PXE of the headless server and the method proceeds in the UEFI environment of the headless server where the exception handler interface encapsulates the stack frame and the exception opcode into a UNDI CDB in block 210. The exception handler executes UNDI code to access the network interface devices of the headless server in block 212, and processes an PXE_OP_EXCEPTION operation on the network interface devices in block 214.

The method proceeds in the hardware level of the headless server in block 216 where a first network interface device of the headless server is selected on which to process the PXE_OP_EXCEPTION operation. A decision is made as to whether or not the processing of the UNDI CBD was successfully communicated to the selected network interface device in decision block 218. For example, a UNDI module of the selected network interface device can be checked to determine if the NIC is connected to a link or has a "connected" status. If the processing of the UNDI CBD was not successfully communicated to the selected network interface device, the "NO" branch of decision block 218 is taken and the method returns to block 214 where the exception handler interface processes an PXE_OP_EXCEPTION operation on the network interface devices. If the processing of the UNDI CBD was successfully communicated to the selected network interface device, the "YES" branch of decision block 218 is taken and the method proceeds to communicate the PXE_OP_EXCEPTION operation to the remote management server in block 220, the remote management server processes and analyzes the exception information included in the PXE_OP_EXCEPTION in block 222, and the method ends in block 224.

Figure 3:
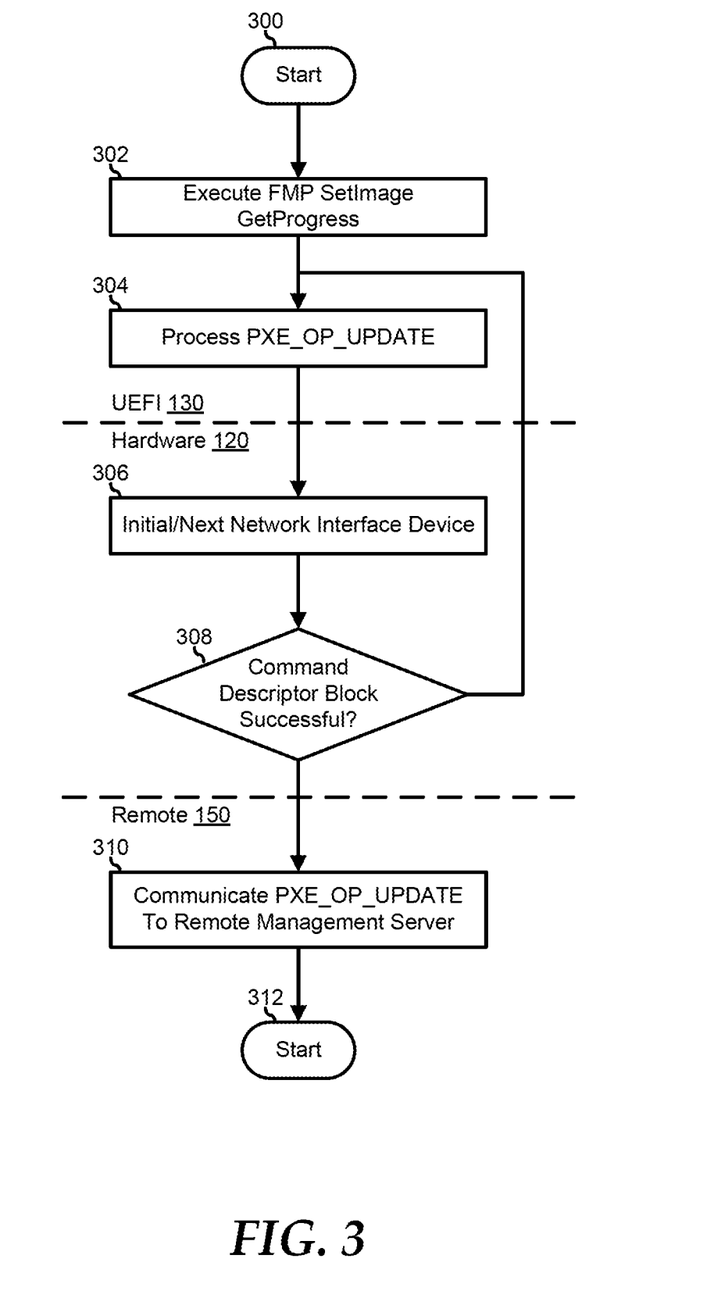
FIG. 3 is a flowchart illustrating a method for tracking the status of firmware updates being performed on a headless server according to an embodiment of the present disclosure.

FIG. 3 is a flowchart illustrating a method for tracking the status of firmware updates being performed on a headless server starting at block 300. The method begins operation in a UEFI environment of the headless server, where a firmware updater of the PXE of the headless server executes a FMP SetImage command to initiate a firmware update and executes a FMP GetProgress command to determine the completion of the firmware update in block 302. The firmware updater processes a PXE_OP_UPDATE operation on the network interface devices in block 304.

The method proceeds in the hardware level of the headless server in block 306 where a first network interface device of the headless server is selected on which to process the PXE_OP_UPDATE operation. A decision is made as to whether or not the processing of the UNDI CBD was successfully communicated to the selected network interface device in decision block 308. If not, the "NO" branch of decision block 308 is taken and the method returns to block 304 where the exception handler interface processes an PXE_OP_UPDATE operation on the network interface devices. If the processing of the UNDI CBD was successfully communicated to the selected network interface device, the "YES" branch of decision block 308 is taken and the method proceeds to communicate the PXE_OP_UPDATE operation to the remote management server in block 310, and the method ends in block 312.

Figure 4:
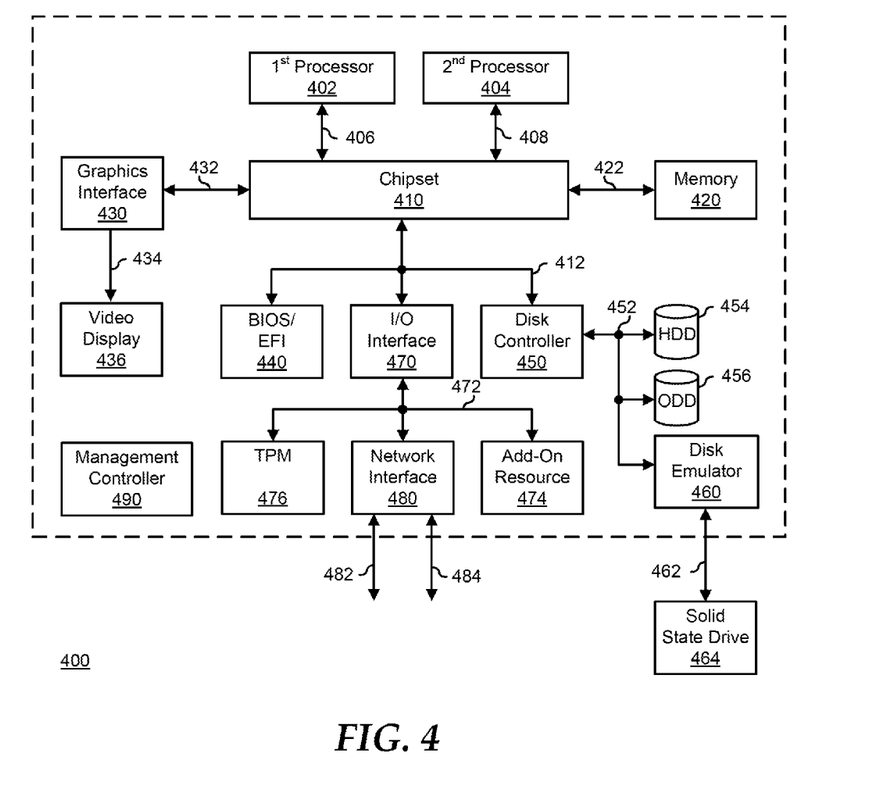
FIG. 4 is a block diagram illustrating a generalized information handling system according to an embodiment of the present disclosure.

FIG. 4 illustrates a generalized embodiment of information handling system 400. For purpose of this disclosure information handling system 400 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 400 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 400 can include processing resources for executing machine-executable code, such as a central processing unit (CPU), a programmable logic array (PLA), an embedded device such as a System-on-a-Chip (SoC), or other control logic hardware. Information handling system 400 can also include one or more computer-readable medium for storing machine-executable code, such as software or data. Additional components of information handling system 400 can include one or more storage devices that can store machine-executable code, one or more communications ports for communicating with external devices, and various input and output (I/O) devices, such as a keyboard, a mouse, and a video display. Information handling system 400 can also include one or more buses operable to transmit information between the various hardware components.

Information handling system 400 can include devices or modules that embody one or more of the devices or modules described above, and operates to perform one or more of the methods described above. Information handling system 400 includes a processors 402 and 404, a chipset 410, a memory 420, a graphics interface 430, a basic input and output system/extensible firmware interface (BIOS/EFI) module 440, a disk controller 450, a disk emulator 460, an input/output (I/O) interface 470, a network interface 480, and a management controller 490. Processor 402 is connected to chipset 410 via processor interface 406, and processor 404 is connected to the chipset via processor interface 408. Memory 420 is connected to chipset 410 via a memory bus 422. In a particular embodiment, information handling system 400 includes separate memories that are dedicated to each of processors 402 and 404 via separate memory interfaces. An example of memory 420 includes random access memory (RAM) such as static RAM (SRAM), dynamic RAM (DRAM), non-volatile RAM (NV-RAM), or the like, read only memory (ROM), another type of memory, or a combination thereof. Graphics interface 430 is connected to chipset 410 via a graphics interface 432, and provides a video display output 434 to a video display 436.

BIOS/EFI module 440, disk controller 450, and I/O interface 470 are connected to chipset 410 via an I/O channel 412. An example of I/O channel 412 includes a Peripheral Component Interconnect (PCI) interface, a PCI-Extended (PCI-X) interface, a high speed PCI-Express (PCIe) interface, another industry standard or proprietary communication interface, or a combination thereof. Chipset 410 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 440 includes BIOS/EFI code operable to detect resources within information handling system 400, to provide drivers for the resources, to initialize the resources, and to access the resources.

Disk controller 450 includes a disk interface 452 that connects the disc controller to a hard disk drive (HDD) 454, to an optical disk drive (ODD) 456, and to disk emulator 460. An example of disk interface 452 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 460 permits a solid-state drive 464 to be connected to information handling system 400 via an external interface 462. An example of external interface 462 includes a USB interface, an IEEE 1394 (Firewire) interface, a proprietary interface, or a combination thereof. Alternatively, solid-state drive 464 can be disposed within information handling system 400.

I/O interface 470 includes a peripheral interface 472 that connects the I/O interface to an add-on resource 474, to a trusted platform module (TPM) 476, and to network interface 480. Peripheral interface 472 can be the same type of interface as I/O channel 412, or can be a different type of interface. As such, I/O interface 470 extends the capacity of I/O channel 412 when peripheral interface 472 and the I/O channel are of the same type, and the I/O interface translates information from a format suitable to the I/O channel to a format suitable to the peripheral channel 472 when they are of a different type. Add-on resource 474 can include a data storage system, an additional graphics interface, a network interface card (NIC), a sound/video processing card, another add-on resource, or a combination thereof. Add-on resource 474 can be on a main circuit board, on separate circuit board or add-in card disposed within information handling system 400, a device that is external to the information handling system, or a combination thereof. TPM 476 can include a dedicated crypto-processor and secure storage, to ensure the integrity of information handling system 400 and to detect and prevent tampering with the operating firmware of the information handling system.

Network interface 480 represents a NIC disposed within information handling system 400, on a main circuit board of the information handling system, integrated onto another component such as chipset 410, in another suitable location, or a combination thereof. Network interface 480 includes network channels 482 and 484 that provide interfaces to devices that are external to information handling system 400. In a particular embodiment, network channels 482 and 484 are of a different type than peripheral channel 472 and network interface 480 translates information from a format suitable to the peripheral channel to a format suitable to external devices. An example of network channels 482 and 484 includes InfiniBand channels, Fibre Channel channels, Gigabit Ethernet channels, proprietary channel architectures, or a combination thereof. Network channels 482 and 484 can be connected to external network resources (not illustrated). The network resource can include another information handling system, a data storage system, another network, a grid management system, another suitable resource, or a combination thereof.

Management controller 490 provides for out-of-band monitoring, management, and control of the respective elements of information handling system 400, such as cooling fan speed control, power supply management, hot-swap and hot-plug management, firmware management and update management for system BIOS or UEFI, Option ROM, device firmware, and the like, or other system management and control functions as needed or desired. As such, management system 490 provides some or all of the functions and features of the management systems described herein.

The preceding description in combination with the Figures is provided to assist in understanding the teachings disclosed herein. The preceding discussion focused on specific implementations and embodiments of the teachings. This focus has been provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
a network interface device coupled to a network, wherein the network interface device is responsive to a Universal Network Device Interface (UNDI) command;
a memory including first code to instantiate an operating system including an exception handler and second code to instantiate an exception handler interface and a UNDI module; and
a processor to execute the first code and the second code;
wherein the operating system:
  detects an exception;
  invokes the exception handler to write a stack frame associated with the exception to an exception stack of the memory in response to detecting the exception, the exception stack being associated with the exception handler; and
  sends an indication to the exception handler interface that the stack frame has been written in the memory; and
wherein the exception handler interface:
  receives the indication that the stack frame has been written in the memory;
  directs the UNDI module to provide the UNDI command to the network interface device to communicate the stack frame to the network in response to receiving the indication;
  receives a request from the UNDI module to analyze the exception stack;
  analyzes the exception stack to detect an exception opcode in response to receiving the request to analyze the exception stack; and
  determines that the stack frame has been written in the memory in response to detecting the exception opcode.

2. The information handling system of claim 1, wherein in writing the stack frame to the memory, the exception handler further:
   analyzes the exception stack to detect an exception opcode; and
   provides an indication to the exception handler interface in response to detecting the exception opcode.

3. The information handling system of claim 2, wherein the exception handler interface determines that the stack frame has been written in the memory based upon the indication from the exception handler.

4. The information handling system of claim 1, wherein in determining that the stack frame has been written in the memory, the exception handler interface:
   detects that the exception handler has executed an exception opcode.

5. The information handling system of claim 4, wherein the exception handler interface determines that the stack frame has been written in the memory in response to detecting the exception opcode.

6. The information handling system of claim 1, wherein the second code comprises a Unified Extensible Firmware Interface (UEFI) environment.

7. A method, comprising:
   detecting, by an operating system running on a processor of an information handling system, that an exception has occurred;
   invoking, by the operating system, an exception handler to write a stack frame associated with the exception to an exception stack of a memory of the information handling system in response to detecting the exception the exception stack being associated with the exception handler;
   sending, by the operating system, an indication to the exception handler interface that the stack frame has been written in the memory;
   receiving, by an exception handler interface running on the processor, the indication that the stack frame has been written in the memory;
   directing, by the exception handler interface, a Universal Network Device Interface (UNDI) module running on the processor to provide a UNDI command to network interface device of the information handling system to communicate the stack frame to a network coupled to the network interface device in response to receiving the indication;
   receiving, by the exception handler interface, a request from the UNDI module to analyze the exception stack;
   analyzing, by the exception handler interface, the exception stack to detect an exception opcode in response to receiving the request to analyze the exception stack; and
   determining that the stack frame has been written in the memory in response to detecting the exception opcode.

8. The method of claim 7, wherein in writing the stack frame to the memory, the method further comprises:
   analyzing, by the exception handler, the exception stack to detect an exception opcode; and
   providing an indication to the exception handler interface in response to detecting the exception opcode.

9. The method of claim 8, wherein the exception handler interface determines that the stack frame has been written in the memory based upon the indication from the exception handler.

10. The method of claim 7, wherein in determining that the stack frame has been written in the memory, the method further comprises:
    detecting, by the exception handler interface that the exception handler has executed an exception opcode.

11. The method of claim 10, wherein the exception handler interface determines that the stack frame has been written in the memory in response to detecting the exception opcode.

12. A non-transitory computer-readable medium including code for performing a method, the method comprising:
    detecting, by an operating system running on a processor, that an exception has occurred;
    invoking, by the operating system, an exception handler to write a stack frame associated with the exception to an exception stack of a memory in response to detecting the exception, the exception stack being associated with the exception handler;
    sending, by the operating system, an indication to the exception handler interface that the stack frame has been written in the memory;
    receiving, by an exception handler interface running on the processor, the indication that the stack frame has been written in the memory;
    directing, by the exception handler interface, a Universal Network Device Interface (UNDI) module running on the processor to provide a UNDI command to network interface device to communicate the stack frame to a network coupled to the network interface device in response to receiving the indication;
    receiving, by the exception handler interface, a request from the UNDI module to analyze the exception stack;
    analyzing, by the exception handler interface, the exception stack to detect an exception opcode in response to receiving the request to analyze the exception stack; and
    determining that the stack frame has been written in the memory in response to detecting the exception opcode.

13. The computer-readable medium of claim 12, wherein in writing the stack frame to the memory, the method further comprises:
    analyzing, by the exception handler, the exception stack to detect an exception opcode; and
    providing an indication to the exception handler interface in response to detecting the exception opcode, wherein the exception handler interface determines that the stack frame has been written in the memory based upon the indication from the exception handler.

14. The computer-readable medium of claim 12, wherein in determining that the stack frame has been written in the memory, the method further comprises:
    detecting, by the exception handler interface that the exception handler has executed an exception opcode, wherein the exception handler interface determines that the stack frame has been written in the memory in response to detecting the exception opcode.

* * * * *